United States Patent [19]

Kosuge

[11] Patent Number: 4,773,661
[45] Date of Patent: Sep. 27, 1988

[54] FRONT FENDERS FOR FOUR WHEELED BUGGY OPERATED BY DRIVER IN SITTING POSTURE

[75] Inventor: Hideyoshi Kosuge, Hyogo, Japan

[73] Assignee: Kawasaki Jukogyo Kabushiki Kaisha, Japan

[21] Appl. No.: 136,546

[22] Filed: Dec. 22, 1987

[30] Foreign Application Priority Data

Jan. 9, 1987 [JP] Japan ............................... 62-1625[U]

[51] Int. Cl.$^4$ .............................................. B62B 9/16
[52] U.S. Cl. ........................... 280/152 R; 280/153 R; 280/154; 296/198; 296/204
[58] Field of Search ............... 280/152 R, 153 R, 154; 180/908, 311, 62, 56; 293/14; 296/78.1, 82, 1 F, 203, 204, 198

[56] References Cited

U.S. PATENT DOCUMENTS 1,372,081 3/1921 Myers ............................ 280/153 R
1,713,405 5/1929 Stansfeld ........................ 280/152 R
1,807,044 5/1931 Merrilies ........................ 280/152 R

FOREIGN PATENT DOCUMENTS 413355 7/1934 United Kingdom ............ 280/152 R

Primary Examiner—John J. Love
Assistant Examiner—Eric Culbreth
Attorney, Agent, or Firm—Leydig, Voit & Mayer

[57] ABSTRACT

A four wheeled buggy operated by a driver in a sitting posture. A steering apparatus is supported by a support frame structure mounted on a longitudinal front end portion of an elongated main frame structure. The support frame structure has a pair of opposite sides positioned between a pair of front wheels, and a pair of extension frames located respectively above the front wheels. A front body has a front inner member fixedly mounted behind the front wheels. A pair of flexible plate-like members formed of elastic material form respectively a pair of front fenders associated respectively with the front wheels. Each plate-like member is bent into a generally inverted L-shape having top and side panel sections detachably mounted respectively to the corresponding extension frame and the corresponding side of the support frame structure. Rear edge portions of the respective top and side panel sections of each plate-like member are detachably mounted to the front inner member of the front body.

6 Claims, 4 Drawing Sheets

FRONT FENDERS FOR FOUR WHEELED BUGGY OPERATED BY DRIVER IN SITTING POSTURE

BACKGROUND OF THE INVENTION

The present invention relates to four wheeled vehicles, such as open-topped vehicles or buggies employed for carrying loads on stock farms, farmland, wastelands and the like and, more particularly, to front fenders for a novel four wheeled buggy operated by a driver in a sitting posture.

A four wheeled buggy operated by a driver in a sitting posture is different in arrangement and disposition of a steering apparatus and driving system from a four wheeled buggy of the straddle type. For this reason, the buggy operated by a driver in a sitting posture is considerably different in body frame construction from a buggy of straddle type.

In general, the four wheeled buggy comprises an elongated main frame structure and a support frame structure mounted on a longitudinal forward end portion of the main frame structure. A steering apparatus is supported by the support frame structure. A pair of front wheels are mounted to the front end portion of the main frame structure. A pair of shock absorbers supported by the support frame structure are associated respectively with the front wheels.

It is necessary to arrange a pair of front fenders respectively above the front wheels in order to prevent the steering apparatus and the shock absorbers from being damaged in their function by mud splashed thereon from the front wheels.

Reference should be made to U.S. Ser. No. 091,891 corresponding to Japanese Utility Model Application No. 61-138039 filed in the name of the same applicant.

SUMMARY OF THE INVENTION

It is an object of the invention to provide a four wheeled buggy operated by a driver in a sitting posture, comprising a pair of front fenders which are easy to manufacture, and easy to assemble and replace.

According to the invention, there is provided a four wheeled buggy operated by a driver in a sitting posture, comprising:

an elongated main frame structure;

a pair of front wheels and a pair of rear wheels mounted respectively adjacent longitudinal front and rear end portions of the main frame structure;

steering means operatively connected to at least one of the pair of front wheels and the pair of rear wheels, for steering the at least one pair of wheels;

a support frame structure mounted on the front end portion of the main frame structure and supporting the steering means, the support frame structure having a pair of opposite sides which are arranged between the pair of front wheels and which are positioned respectively adjacent the pair of front wheels, the support frame structure including a pair of extension frames positioned respectively above the pair of front wheels;

a front body mounted on the front end portion of the main frame structure and having a front inner member fixedly mounted behind the pair of front wheels; and a pair of front fenders associated respectively with the pair of front wheels, each of the front fenders comprising a flexible plate-like member formed of an elastic material, the plate-like member being bent into a generally inverted L-shape having a top panel section and a side panel section depending therefrom, the top panel section being detachably mounted to a corresponding one of the pair of extension frames, the side panel section being detachably mounted to a corresponding one of the opposite sides of the support frame structure, the top panel section and the side panel section having their respective rear edge portions detachably mounted to the front inner member of the front body.

DETAILED DESCRIPTION

Figure 1:
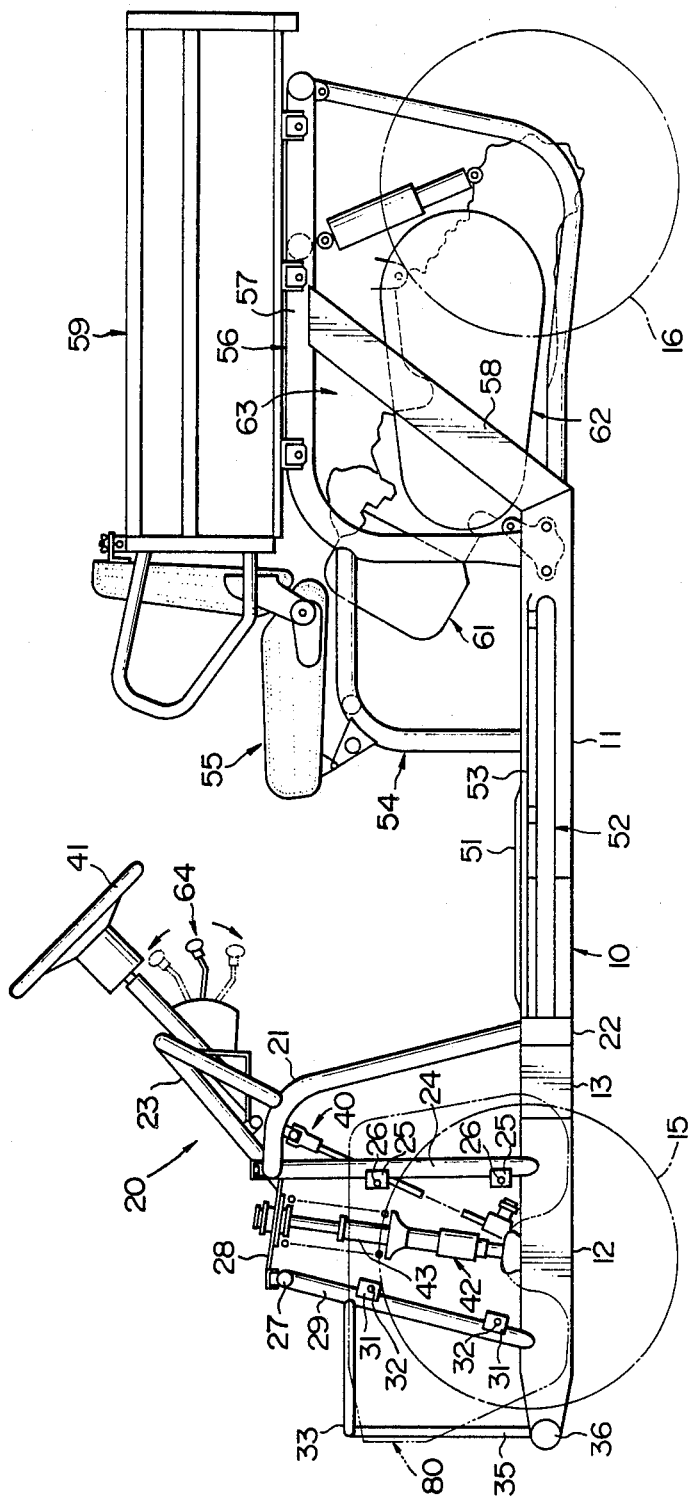
FIG. 1 is a side elevational view of a four wheeled buggy according to an embodiment of the invention, with a front body removed.
Figure 2:
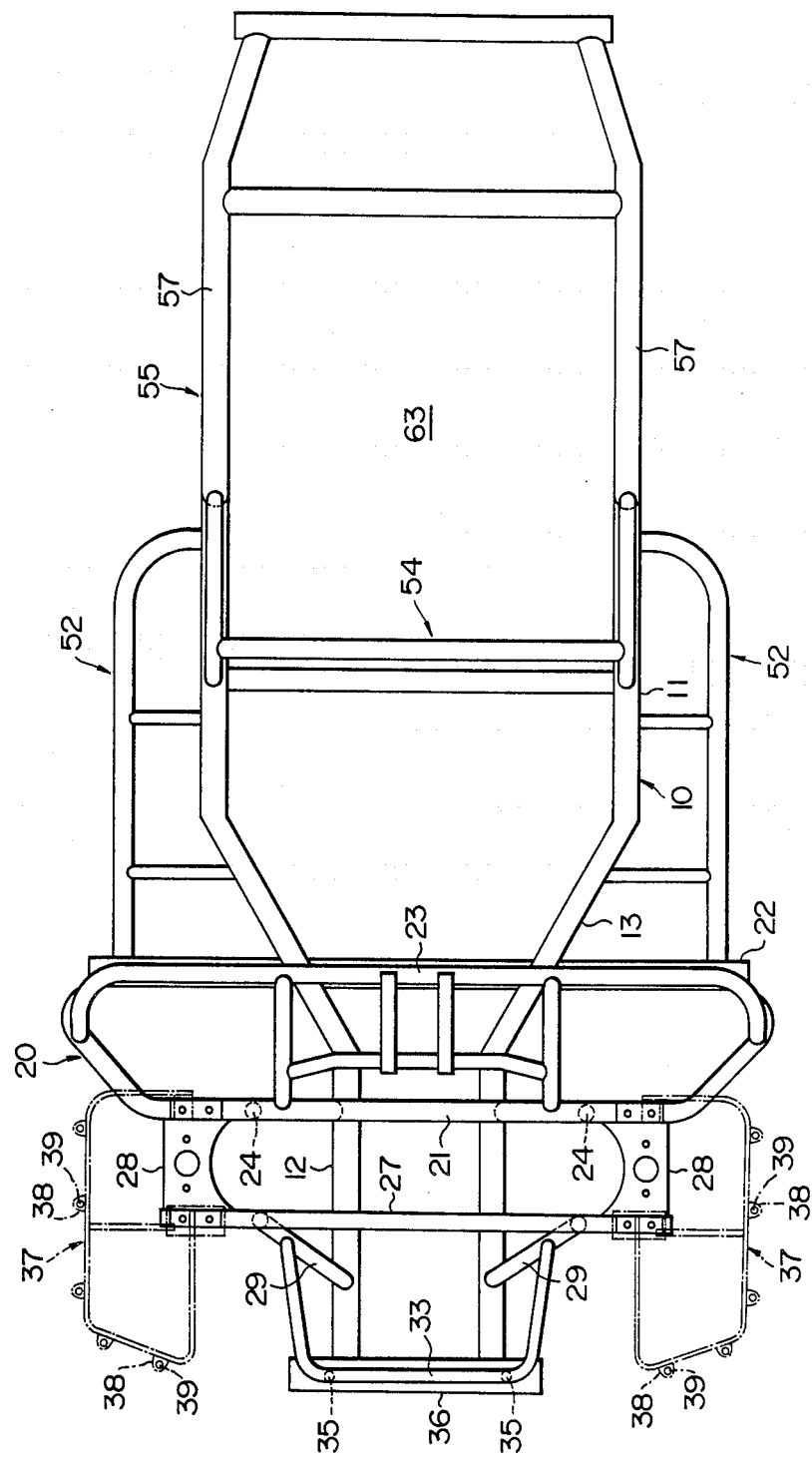
FIG. 2 is a top plan view of a frame construction illustrated in FIG. 1.

Referring to FIG. 1, there is shown a four wheeled buggy operated by a driver in a sitting posture, according to an embodiment of the invention. As will clearly be seen from FIG. 2, the buggy comprises an elongated flat main frame structure 10. The main frame structure 10 is composed of a generally rectangular body 11, a reduced-width longitudinal front end portion 12, and a connecting portion 13 between the body 11 and the front end portion 12. A pair of front wheels 15 (only one shown in FIG. 1) are mounted to the front end portion 12 of the main frame structure 10 through respective independent suspensions (not shown). A pair of rear wheels 16 (only one shown in FIG. 1) are mounted adjacent the opposite rear end of the main frame structure 10.

A support frame structure 20 comprises a rear pipe 21 generally in the form of an inverted U-shape having a pair of legs. The legs of the rear pipe 21 have their respective lower ends which are fixed respectively to opposite ends of a cross bar 22 fixedly mounted to the main frame structure 10. An upper pipe 23 generally in the form of an inverted U-shape has a pair of legs which have their respective lower ends fixed respectively to upper ends of the respective legs of the rear pipe 21. A pair of lower pipes 24 have their respective upper ends which are fixed to an upper horizontal portion of the rear pipe 21 respectively adjacent the opposite ends of the upper horizontal portion. Lower ends of the respective lower pipes 24 are respectively fixed to the opposite sides of the front end portion 12 of the main frame structure 10. Two brackets 25 each having a screw bore 26 are fixedly secured respectively to the lower end portion and the longitudinally midway portion of each of the lower pipes 24. An upper cross pipe 27 is spaced forwardly from the upper horizontal portion of the rear pipe 21 in parallel relation thereto. The upper cross pipe 27 is connected to the upper horizontal portion of the rear pipe 21 by a pair of end connecting plates 28. A pair of front suspension pipes 29 have their respective upper ends connected to the upper cross pipe 27 adjacent the opposite ends thereof. The front suspension pipes 29 have their respective lower ends which are fixedly secured respectively to the opposite sides of the front end portion 12 of the main frame structure 10. Two brackets 31 each having a screw bore 32 are fixedly mounted respectively to the lower end portion and the longitudinally midway portion of each of the front suspension pipes 29. A horizontally arranged, generally U-shaped lower cross pipe 33 has a pair of legs having their respective free ends which are fixedly secured respectively to the front suspension pipes 29 adjacent their respective upper ends. The lower cross pipe 33 is supported, through a pair of vertical pipes 35, on a cross bar 36 fixed to the free end of the forward end portion 12 of the main frame structure 10. As indicated by the phantom lines in FIG. 2, a pair of flat extension frames 37 are attached respectively to the opposite ends of the upper horizontal portion of the rear pipe 21 and the opposite ends of the upper cross pipe 27. The extension frames 37 are positioned respectively above the pair of front wheels 15. Brackets 38 each having a screw bore 39 are fixedly attached to each of the extension frames 37. As will be understood from the foregoing, one of the pair of lower pipes 24 and the adjacent one of the pair of the front suspension pipes 29 form one of a pair of opposite sides of the support frame structure 20 which are disposed between the pair of front wheels 15 and which are positioned respectively adjacent the front wheels 15. The other lower pipe 24 and the adjacent other front suspension pipe 29 form the other side of the support frame structure 20.

A steering apparatus 40 having a steering wheel 41 is supported by the support frame structure 20. The steering apparatus 40 is operatively connected to the front wheels 15 for steering the same.

A pair of shock absorbers 42, each having a strut 43, have their respective upper ends which fixedly mounted respectively to the pair of end connecting plates 28. Lower ends of the respective shock absorbers 42 are connected respectively to axles of the respective front wheels 15.

A floor plate 51 is fixedly mounted to the main frame structure 10 at a location rearwardly of the support frame structure 20. A pair of frames 52 for attachment of respective steps 53 are mounted to the main frame structure 10 so as to project laterally therefrom. Rearwardly of the floor plate 51, a seat attaching frame 54 is mounted to the main frame structure 10, and a seat 55 is attached to the seat attaching frame 54. An engine attaching frame 56 is mounted at the rear end of the main frame structure 10 and extends rearwardly therefrom. The seat attaching frame 54 has a rear end connected to the engine attaching frame 56. The engine attaching frame 56 has a pair of horizontal portions 57 which are supported respectively by a pair of inclined frames 58 which are connected to the rear end of the main frame structure 10. A carrier 59 is supported on the horizontal portions 57 of the engine attaching frame 56.

An engine 61 and a transmission 62 are arranged within a space 63 defined by the seat attaching frame 54 and the engine attaching frame 56 so as not to project downwardly from the main frame structure 10. The engine 61 and the transmission 62 are supported by the engine attaching frame 56. The transmission 62 is operatively connected to a shift control apparatus 64 which is supported by the support frame structure 20 adjacent the steering wheel 41 of the steering apparatus 40.

Figure 3:
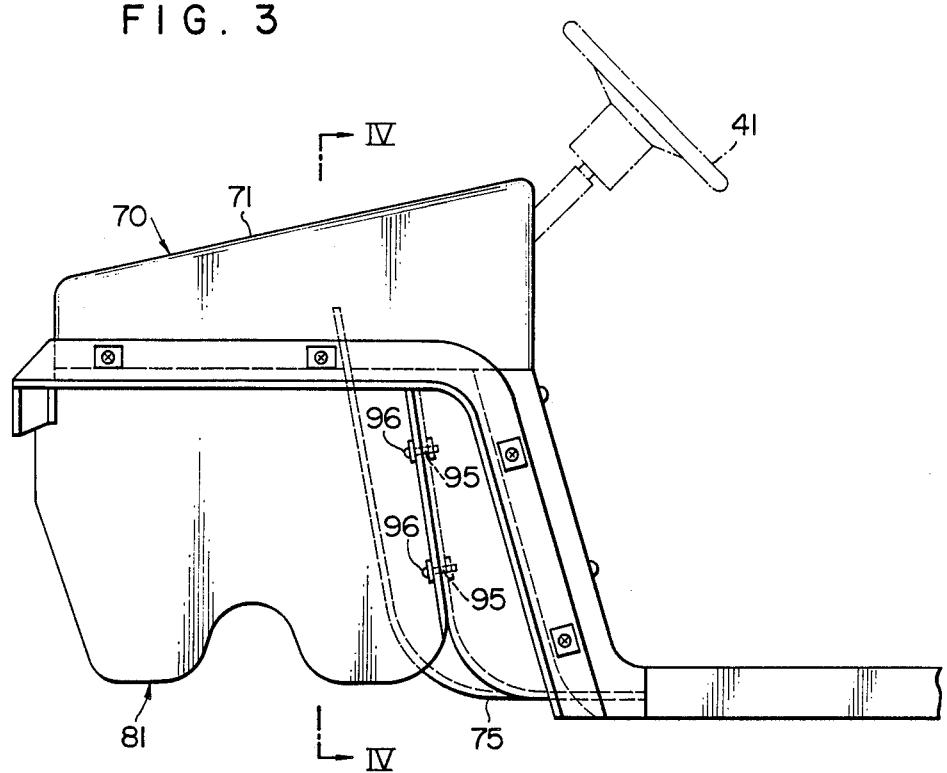
FIG. 3 is a fragmental side elevational view of the front body mounted to the buggy illustrated in FIG. 1.
Figure 4:
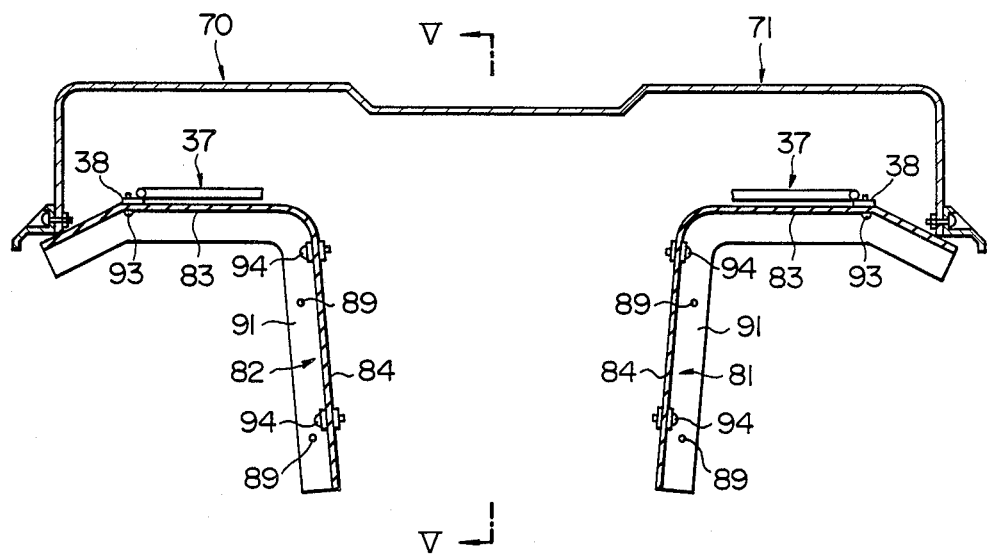
FIG. 4 is a cross-sectional view taken along line IV—IV in FIG. 3.
Figure 5:
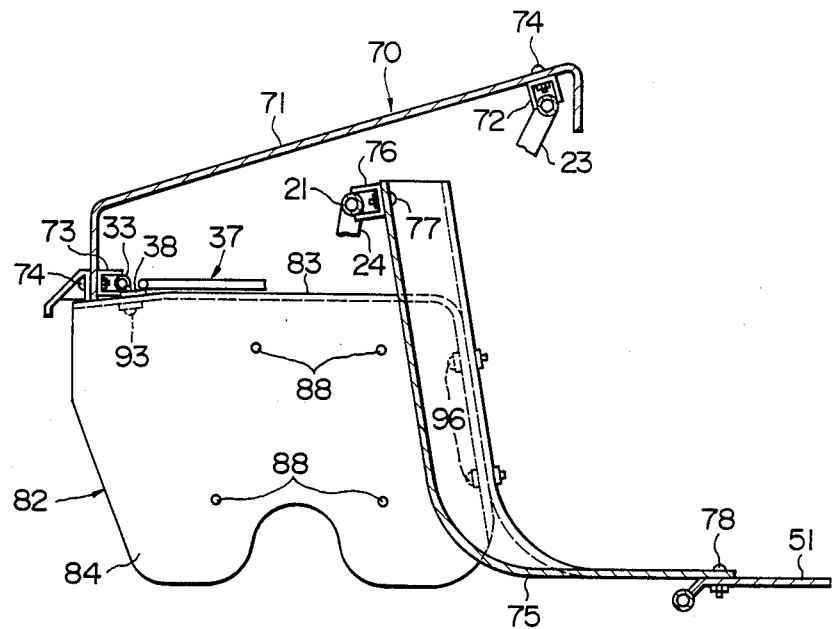
FIG. 5 is a cross-sectional view taken along line V—V in FIG. 4.

As shown in FIGS. 3 through 5, a front body 70 comprises an upper body member 71. As clearly seen from FIG. 5, the upper body member 71 is attached to brackets 72 fixedly secured to the upper horizontal portion of the upper pipe 23 of the support frame structure 20, and to brackets 73 fixedly secured to the lower cross pipe 33 by respective screws 74. The front body 70 further comprises a generally L-shaped front inner member 75 which is positioned behind the front wheels 15. A central portion of an upper end of the front inner member 75 (see FIG. 5) is attached to brackets 76 fixedly secured to the upper horizontal portion of the rear pipe 21, by respective screws 77. A lower end of the front inner member 75 is secured to the front end of the floor plate 51.

As indicated by the phantom line in FIG. 1, a pair of front fenders 80 (only one shown in FIG. 1), by which the invention is characterized, are associated respectively with the front wheels 15. One of the pair of front fenders 80 comprises a flexible plate-like member 81 such as a rubber plate shown in FIG. 6. The other front fender 80 comprises a flexible plate-like member 82 shown in FIG. 7. The flexible plate-like members 81 and 82 are cut respectively into generally rectangular shapes symmetrical in configuration. The flexible plate-like members 81 and 82 are identical in arrangement with each other, and only the member 81 will therefore be described below with reference to FIG. 6.

Figure 6:
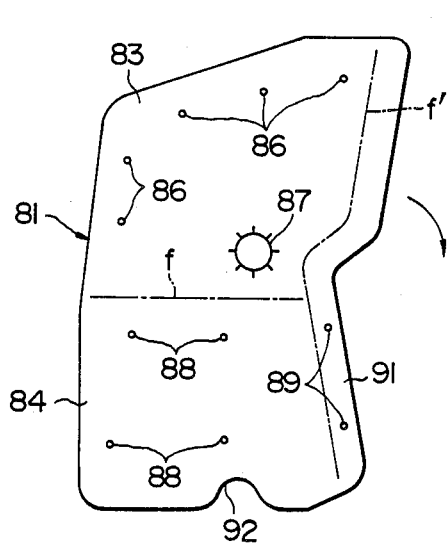
FIGS. 6 and 7 are developed views respectively showing respective flexible plate-like members of a pair of front fenders (only one shown) indicated by the phantom line in FIG. 1.
Figure 7:
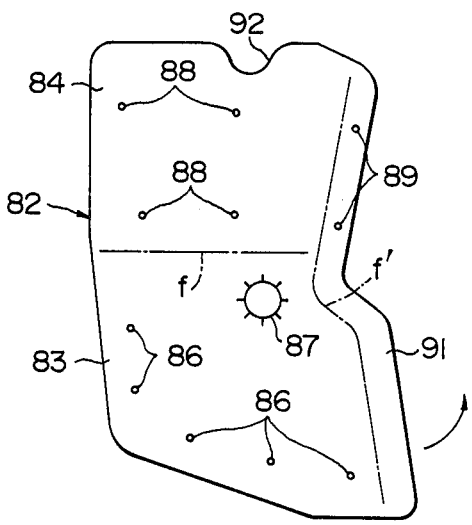

The flexible plate-like member 81 has first and second sections which respectively form a top panel section 83 and a side panel section 84 depending therefrom, when the plate-like member 81 is bent into an inverted L-shape along a bending line f indicated by the dot-and-dash line in FIG. 6 at the time of attachment of the plate-like member 81 as shown in FIGS. 3 through 5. Small attachment bores 86 are formed in front and upper edge portions of the top panel section 83. In addition, a bore 87 is formed in the top panel section 83 adjacent the bending line f, and the strut 43 of the corresponding shock absorber 42 shown in FIG. 1 is adapted to extend through the bore 87. Likewise, small attachment bores 88 are formed in a lower edge portion of the side panel section 84, and adjacent the bending line f. A pair of small attachment bores 89 are also formed, adjacent the side panel section 84, in a rear edge portion 91 of the flexible plate-like member 81 which rear edge portion 91 is bent in an L-shape along a bending line f' indicated by the dot-and-dash line in FIG. 6 at the time of attachment of the plate-like member 81. A recess 92 is formed at the lower edge of the side panel section 84, for permitting the axle of the corresponding front wheel 15 to be received in the recess 92.

When attached, the flexible plate-like member 81 is bent into an inverted L-shape along the bending line f as shown in FIG. 4. The attachment bores 86 in the top panel section 83 are aligned respectively with the screw bores 39 in the respective brackets 38 fixedly secured to the corresponding extension frame 37. Then, as shown in FIGS. 4 and 5, the top panel section 83 is detachably attached to the extension frame 38 by self tapping screws 93. The attachment bores 88 in the side panel section 84 are aligned respectively with the screw bores 26 in the respective brackets 25 fixedly secured to the corresponding lower pipe 24 and with the screw bores 32 in the respective brackets 31 fixedly secured to the corresponding front suspension pipe 29 shown in FIG. 1. Then, as shown in FIG. 4, the side panel section 84 is attached to the lower pipe 24 and the front suspension pipe 29 by self tapping screws 94. Subsequently, the rear edge portion 91 of the flexible plate-like member 81 is bent into an L-shape along the bending line f' in such a manner that the rear edge portion of the top panel section 83 is directed downwardly and the rear edge portion of the side panel section 84 is directed toward the corresponding front wheel 15. The attachment bores 89 in the rear edge portion 91 are aligned respectively with screw bores 95 in the front inner member 75 shown in FIG. 3, and the rear edge portion 91 is detachably attached to the front inner member 75 by self tapping screws 96. Then, the strut 43 of the corresponding shock absorber 42 shown in FIG. 1 is passed through the bore 87 in the top panel section 83. In the manner like that described above, the flexible plate-like member 82 is attached to the corresponding extension frame 37, lower pipe 24 and front suspension pipe 29 and to the front inner member 75.

In this manner, the pair of front fenders 80 are arranged respectively above the pair of front wheels 15 such that the side panel sections 84 of the respective flexible plate-like members 81 and 82 serve respectively as parts of the respective sides of the front body 70. As a consequence, mud is prevented from splashing from the front wheels 15 onto the steering apparatus 40 and the shock absorbers 42. In addition, the top panel sections 83 of the respective flexible plate-like members 81 and 82 cover respectively the inner surface of the respective opposite sides of the body upper member 71 of the front body 70, to prevent mud from being splashed on these inner surfaces. Thus, it is possible for the front fenders 80 to function efficiently.

The embodiment has been described as having the extension frames 37 which are attached to the upper horizontal portion of the rear pipe 21 and the upper cross pipe 27. However, the extension frames 37 may be formed integrally with the rear pipe 21 and the upper cross pipe 27. In addition, the flexible plate-like members 81 and 82 should not be limited to the illustrated configuration, but may be cut into any desired configuration in conformity with the configuration of the support frame structure 20 and the front body 70. Further, the steering apparatus 40 may be operatively connected to the rear wheels 16 for steering the same, or to both front and rear wheels 15 and 16 for steering the same.

As described above, in the four wheeled buggy according to the invention, the pair of front fenders arranged respectively above the pair of front wheels have flexible plate-like members. Each of the flexible plate-like members is bent into an inverted L-shape such that the side panel section is attached to a corresponding one of the opposite sides of the support frame structure to serve as a part of a corresponding one of the opposite sides of the front body. Accordingly, mud is prevented from splashing from the front wheels on the steering apparatus and the shock absorbers so that the function thereof is not damaged. Moreover, the top panel section of each of the flexible plate-like members bent into the inverted L-shape is attached to a corresponding one of the extension frames to cover the inner surface of the corresponding side of the front body. This prevents the inner surfaces of the respective sides of the front body from being contaminated with mud splashed from the front wheels. Thus, the function of the front fenders can be exhibited sufficiently.

Furthermore, since the flexible plate-like members of the respective front fenders are bent into the inverted L-shape when attached, it is easy to manufacture the plate-like members, and is also easy to assemble and replace the plate-like members. Thus, the working efficiency can be improved.

What is claimed is:

1. A four wheeled buggy operated by a driver in a sitting posture comprising:
   an elongated main frame structure;
   a pair of front wheels and a pair of rear wheels mounted respectively adjacent longitudinal front and rear end portions of said main frame structure;
   steering means operatively connected to at least one of said pair of front wheels and said pair of rear wheels, for steering the at least one pair of wheels;
   a support frame structure mounted on said front end portion of said main frame structure and supporting said steering means, said support frame structure having a pair of opposite sides which are arranged between said pair of front wheels and which are positioned respectively adjacent said pair of front wheels, said support frame structure including a pair of extension frames positioned respectively above said pair of front wheels;
   a front body mounted on said front end portion of said main frame structure and having a front inner member fixedly mounted behind said pair of front wheels; and
   a pair of front fenders proximate to said pair of front wheels, each of said front fenders comprising a flexible plate-like member formed of an elastic material, the plate-like member being bent into a generally inverted L-shape having a top panel section and a side panel section depending therefrom, said top panel section being detachably mounted to a corresponding one of said pair of extension frames, said side panel section being detachably mounted to a corresponding one of said opposite sides of said support frame structure, said top panel section and said side panel section having their respective rear edge portions detachably mounted to said front inner member of said front body.

2. A four wheeled buggy as defined in claim 1, wherein said flexible plate-like members of the respective front fenders are formed respectively by rubber plates cut into their respective shapes substantially symmetrical in configuration.

3. A four wheeled buggy as defined in claim 1, wherein the rear edge portion of said top panel section of said flexible plate-like member of each of said front fenders is bent into a generally L-shape and is directed toward a corresponding one of said pair of front wheels, and the rear edge portion of said side panel section of said flexible plate-like member of each of said front fenders is bent into a generally L-shape and is directed downwardly.

4. A four wheeled buggy as defined in claim 1, including a plurality of self tapping screws by which said top panel section and said side panel section of said flexible plate-like member of each of said front fenders are detachably attached to the corresponding extension frame and the corresponding side of said support frame structure and to said front inner member of said front body.

5. A four wheeled buggy as defined in claim 1, wherein each of said pair of opposite sides of said support frame structure comprises a plurality of pipes extending upwardly from said main frame structure.

6. A four wheeled buggy as defined in claim 1, wherein said steering means comprises a steering wheel.

* * * * *